United States Patent
Othayoth et al.

(10) Patent No.: US 10,146,613 B2
(45) Date of Patent: Dec. 4, 2018

(54) SYMMETRY MANAGEMENT IN MULTIPROCESSOR SYSTEMS

(71) Applicant: International Business Machines Corporation, Armonk, NY (US)

(72) Inventors: Jayanth Othayoth, Bangalore (IN); Venkatesh Sainath, Bangalore (IN); Vishwanatha Subbanna, Bangalore (IN); Dhruvaraj Subhashchandran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 14/882,546

(22) Filed: Oct. 14, 2015

(65) Prior Publication Data
US 2017/0109228 A1   Apr. 20, 2017

(51) Int. Cl.
- G06F 11/00  (2006.01)
- G06F 11/07  (2006.01)
- G06F 15/00  (2006.01)

(52) U.S. Cl.
CPC ...... *G06F 11/0793* (2013.01); *G06F 11/0724* (2013.01); *G06F 15/00* (2013.01)

(58) Field of Classification Search
CPC .................. G06F 11/0793; G06F 11/0724
See application file for complete search history.

(56) References Cited

U.S. PATENT DOCUMENTS

| | | | |
|---|---|---|---|
| 2011/0219208 A1* | 9/2011 | Asaad | G06F 15/76 712/12 |
| 2015/0067229 A1 | 3/2015 | Connor et al. | |
| 2016/0085571 A1* | 3/2016 | Kim | G06F 9/45558 718/1 |

* cited by examiner

*Primary Examiner* — Bryce P Bonzo
*Assistant Examiner* — Katherine Lin
(74) *Attorney, Agent, or Firm* — Stosch Sabo (57) ABSTRACT

A set of processors in a symmetric multiprocessor (SMP) system are deconfigured following a first failed processor to return the SMP system to a symmetric state. One or more deconfiguration options are identified, and a respective cost is calculated for each deconfiguration option. A deconfiguration option is selected and applied to the SMP system based on the respective costs of the one or more identified deconfiguration options.

20 Claims, 5 Drawing Sheets

SYMMETRY MANAGEMENT IN MULTIPROCESSOR SYSTEMS

BACKGROUND

The present disclosure relates to computer architecture, and more specifically, to maintaining symmetry amongst a plurality of processors in a multi-node system.

One aspect of computer architecture in multiprocessor systems involves processor configuration. Some examples of processor configuration are symmetric multiprocessor architectures (SMP) and non-uniform memory access (NUMA) multiprocessor architectures. In SMP and NUMA systems, the symmetric nature of the processor configuration is beneficial to system performance.

SUMMARY

Aspects of the present disclosure can include a method comprising identifying a first failed processor, where the first failed processor is a component of a symmetric multiprocessor system and is associated with a set of horizontally corresponding processors and a set of vertically corresponding processors. Further aspects of the present disclosure can include calculating a horizontal cost of deconfiguring the first failed processor and the set of horizontally corresponding processors and calculating a vertical cost of deconfiguring the first failed processor and the set of vertically corresponding processors. Further aspects of the present disclosure can include determining a first deconfiguration based on the horizontal cost and the vertical cost and deconfiguring a set of processors associated with the first deconfiguration.

Aspects of the present disclosure can further include a system comprising a symmetric multiprocessor architecture having a plurality of nodes, where each node comprises a plurality of processors. The system can further include an interface configured to present a user with information and receive user inputs. The system can further include a control unit operably coupled to the symmetric multiprocessor architecture and the interface. The control unit can comprise a memory and a processor configured to identify a first failed processor of the symmetric multiprocessor architecture. The processor of the control unit can be further configured to identify one or more sets of deconfigurations which return the symmetric multiprocessor architecture to a symmetric state. The processor of the control unit can be further configured to calculate a first set of respective costs for each respective set of deconfigurations and select one of the one or more sets of deconfigurations based on the respective costs for each set of deconfigurations. The processor of the control unit can be further configured to deconfigure a set of processors associated with the selected deconfiguration.

Aspects of the present disclosure can further include a computer program product for managing symmetry in a symmetric multiprocessor system. The computer program product can comprise a computer readable storage medium having program instructions embodied therewith. The program instructions can be executed by a processor and can cause the processor to determine a plurality of deconfiguration options which can cause the symmetric multiprocessor architecture to return to a symmetric state. The program instructions can further cause the processor to determine a respective cost for each respective deconfiguration option and output a respective set of costs associated with the plurality of deconfiguration options. The program instructions can further cause the processor to select a first deconfiguration option and apply the first deconfiguration option to the symmetric multiprocessor system.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to processor configuration in multiprocessing systems. More particular aspects relate to deconfiguration of failed processors in symmetric multiprocessing systems. Although not limited to such applications, an understanding of some embodiments of the present disclosure may be improved given the context of symmetry management in symmetric multiprocessor (SMP) systems.

One type of symmetric multiprocessing system is non-uniform memory access (NUMA) systems. In NUMA systems, memory access time is a function of memory location relative to the processor. Thus, NUMA systems can provide expeditious computing in cases where specific data is correlated with certain tasks, and, thus, certain processes can be associated with dedicated processors and storage.

Some embodiments of the present disclosure relate to deconfiguration of failed processors. A failed processor associated with a symmetric architecture (e.g., a SMP or a NUMA architecture) can cause the system to be asymmetric. Asymmetries in a symmetric architecture are associated with degraded performance. Thus, it can be beneficial to modify one or more processors to return the architecture to a symmetric state. In some cases, the architecture can be modified by deconfiguring a set of processors associated with the failed processor. In some instances, there are numerous deconfiguration options which will return the system architecture to a symmetric state. In cases having multiple deconfiguration options, a user or program can determine which deconfiguration option to apply. Since each processor can be associated with a set of unique resources (e.g., memory, expansion cards, etc.), the various deconfiguration options can be associated with different amounts and types of lost resources. In accordance with some embodiments of the present disclosure, the failed processors can be deconfigured in a manner which minimizes the lost resources associated with the deconfigured processors. Thus, some embodiments of the present disclosure determine a resource-effective deconfiguration protocol for a given processor failure.

In some embodiments, a resource-effective deconfiguration protocol can be determined in the event of a second processor failure. The deconfiguration protocol of the second processor failure can modify a first deconfiguration protocol. That is to say, the first deconfiguration protocol for the first failed processor can be undone (reconfigured) and a new deconfiguration protocol can be applied to both the first failed processor and the second failed processor to return the symmetric multiprocessor system to a symmetric state. Thus, aspects of the present disclosure can identify and apply beneficial deconfiguration protocols in the case of multiple processor failures.

Advantageously, aspects of the present disclosure can reduce lost resources in the event of a failed processor in a symmetric multiprocessing architecture. Aspects of the present disclosure can reduce lost resources by determining a deconfiguration which returns the processor configuration to a symmetric state while minimizing (relative to alternative deconfiguration options) lost resources such as, for example, memory. Aspects of the present disclosure can select a set of deconfigurations which further reduces losses associated with expansion cards, compatibility issues, and memory affinity issues. Some embodiments of the present disclosure further advantageously allow the first deconfiguration of a first failed processor to be changed in light of a second failed processor. Thus, some advantages of the present disclosure relate to reduced resource losses associated with deconfigurations, and further, to dynamic deconfigurations which can modify previous deconfigurations given the location of, and resources associated with, additional failed processors following the first failed processor.

It is understood that the advantages described herein are examples of advantages and not every advantage is listed. Furthermore, some embodiments of the present disclosure can exhibit all, some, or none of the advantages listed herein while remaining within the spirit and scope of the present disclosure.

For the purposes of the present disclosure, the term "deconfigure" and "deconfiguration" shall refer to the removal (either physical or virtual) of a component from the symmetric multiprocessor system. Conversely, the term "reconfigure" and "reconfiguration" shall be construed to mean the undoing of a "deconfiguration" or the returning of a component to an operational state within the symmetric multiprocessor system. Thus, a processor which is deconfigured will be, in whole or in part, functionally de-coupled from the computer architecture. In such an example, the deconfigured processor may, in some embodiments, retain communication with one or more components of the computer architecture, but the processor will be unable to conduct normal processes associated with said processor. The same processor, if reconfigured, shall be operably re-coupled to the computer architecture and function normally. Furthermore, although the present disclosure discusses a first processor failure and a second processor failure, the present disclosure is applicable to any number of processor failures.

Figure 1:
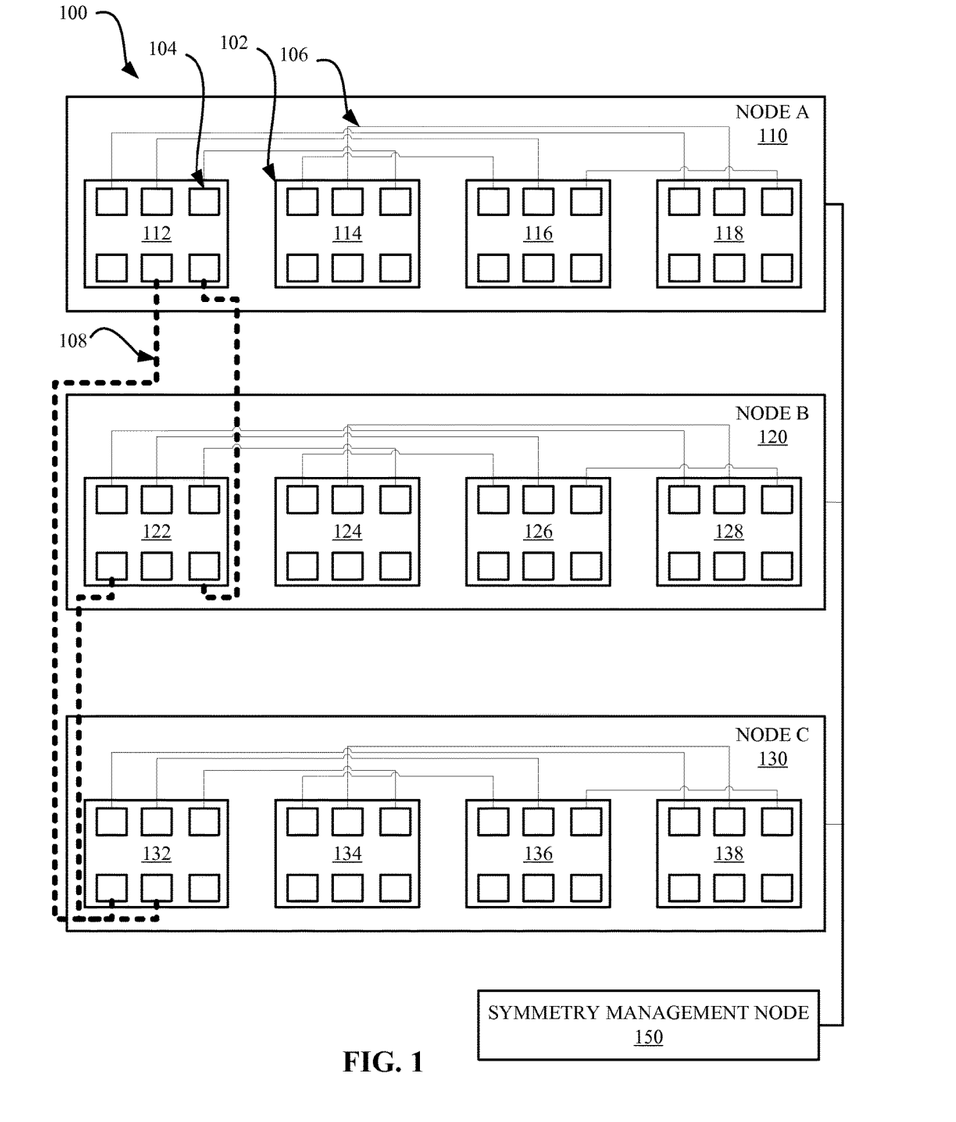
FIG. 1 illustrates a block diagram of a symmetric multiprocessor architecture in accordance with some embodiments of the present disclosure.

With reference now to FIG. 1, illustrated is a block diagram of a symmetric multiprocessor architecture in accordance with some embodiments of the present disclosure. Although applicable to any symmetric multiprocessor system, FIG. 1 will be described with reference to a NUMA architecture in accordance with some embodiments of the present disclosure. The NUMA architecture 100 can comprise one or more nodes such as node A 110, node B 120, and node C 130. Each node can comprise one or more processors 102 (i.e., 112-118, 122-128, 132-138). For the purposes of the present disclosure, processor 102 refers to a generic processor while the individual processors 112-118, 122-128, and 132-138 are detailed to describe the relationships between processors. Each processor 102 can contain a plurality of elements 104. The elements can comprise cores, memories (e.g., dynamic random access memory (DRAM), static random access memory (SRAM), Flash, individual caches, and/or shared caches), interfaces (e.g., network, I/O, and expansion card interfaces), among other elements which can be useful to a multiprocessor architecture. Thus, although FIG. 1 depicts the elements 104 being contained within the processor 102, the elements 104 can also be adjacent to or otherwise connected with, a respective processor 102 or shared amongst a plurality of processors in a given node. For example, processors 112-118 of node A 110 can, in some embodiments, share memory, storage, interface connections, and so on.

In some embodiments, the processors of each respective node are communicatively coupled by inter-nodal connections 106. The inter-nodal connections 106 are shown for exemplary purposes and processors sharing a node in a computer architecture can be communicatively coupled to one another in similar or dissimilar ways.

In some embodiments, the respective processors of each node are communicatively coupled to one another via intra-nodal connections 108 (dashed emboldened lines). The connections 108 can comprise a physical connection while in alternative embodiments the connections 108 can be virtual connections. In either case, connections 108 can provide a communication link between respective vertical processors (e.g., 112, 122, and 132). Connections 108 between 112, 122, and 132 are shown as an exemplary set of connections. This exemplary set of connections can occur for the other vertically associated processors (e.g., 116, 126, and 136). In some cases, the connections 108 can occur in orientations other than the orientations shown and described.

The NUMA architecture can further comprise a symmetry management node 150 which is communicatively coupled to nodes of the NUMA architecture. The symmetry management node 150 can be coupled to the nodes 110, 120, and 130 via a physical or virtual communication medium. In some embodiments, the symmetry management node 150 is discrete from the NUMA architecture while in alternative embodiments the symmetry management node 150 is a designated node of the NUMA architecture, and, thus, can be capable of executing computational tasks associated with the NUMA architecture as well as administrative tasks associated with symmetry management of the NUMA architecture.

Thus, FIG. 1 illustrates aspects of a NUMA architecture (or, more generally, a SMP system) in accordance with some embodiments of the present disclosure. Namely, a NUMA architecture contains a plurality of nodes (e.g., 110, 120, and 130). Each node contains a plurality of processors 102. Each processor can be connected to the other processors in the NUMA architecture 100 via inter-nodal connections 106 and intra-nodal connections 108. The processors can be grouped horizontally or vertically. For the purposes of the present disclosure, horizontally grouped processors are grouped according to node (e.g., node A 110, node B 120, and node C 130) and vertically grouped processors are grouped by corresponding locations within each node (e.g., the common last digit "2" indicates the vertical association between processors 112, 122, and 132). The NUMA architecture can contain a symmetry management node 150 which can manage aspects of the NUMA architecture as further described hereinafter with respect to FIG. 2-5.

Figure 2:
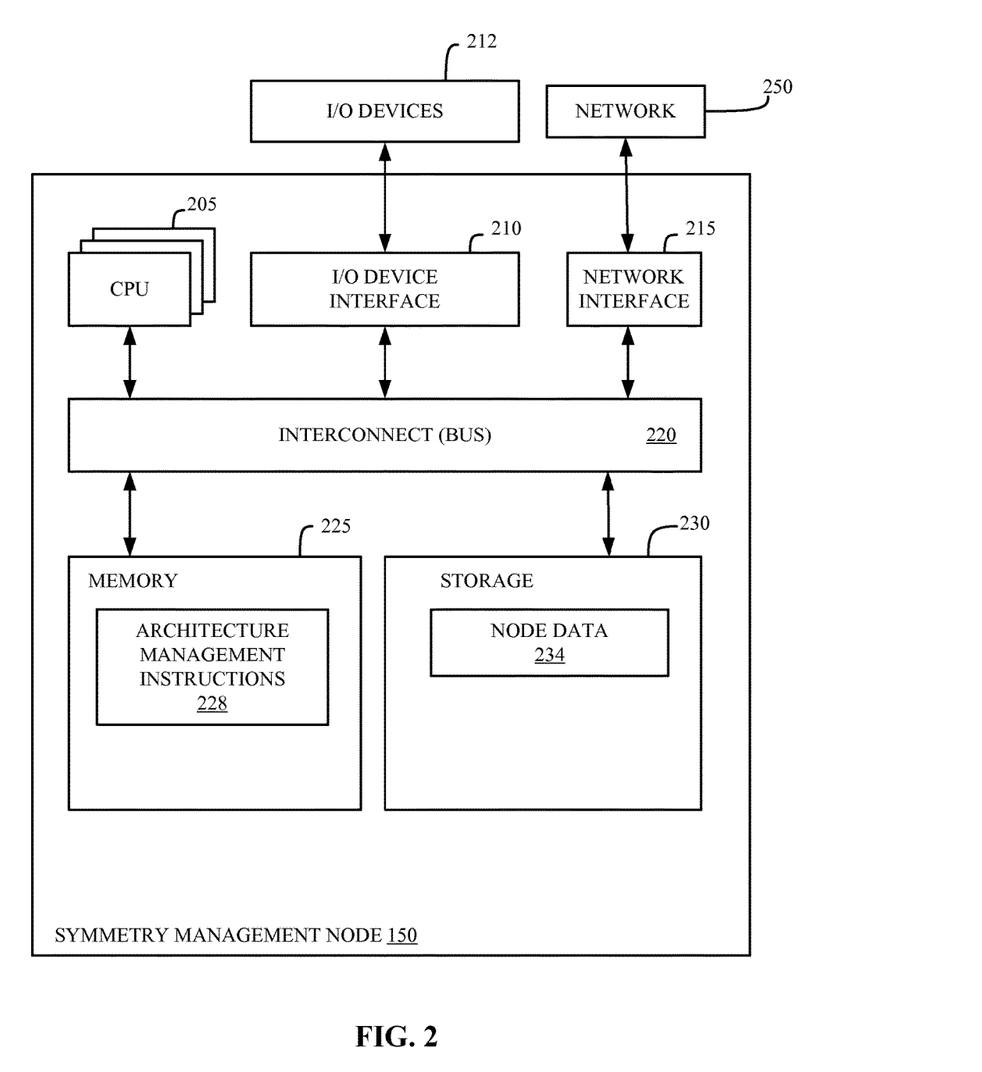
FIG. 2 illustrates a symmetry management node of a symmetric multiprocessor architecture in accordance with some embodiments of the present disclosure.

Referring now to FIG. 2, illustrated is a symmetry management node of a symmetric multiprocessor architecture according to some embodiments of the present disclosure. The symmetry management node 150 of FIG. 2 can be the same or substantially the same as symmetry management node 150 of FIG. 1. In some embodiments, the symmetry management node 150 is not a standalone device (as shown with respect to FIG. 1) but rather is a node of the symmetric multiprocessor architecture which is designated as a symmetry management node. Thus, in various embodiments, the symmetry management node 150 can be the same or substantially the same as one of the nodes 110, 120, or 130 as shown and described with respect to FIG. 1. In such embodiments, the components of the symmetry management node 150 (e.g., items 205-234 of FIG. 2) can be the same or substantially the same as the elements 104 of FIG. 1. Although FIG. 2 is applicable to a symmetry management node of any symmetric multiprocessor system, FIG. 2 will be described with respect to a symmetry management node of a NUMA architecture in accordance with some embodiments of the present disclosure.

In various embodiments, the symmetry management node 150 includes a memory 225, storage 230, an interconnect (e.g., BUS) 220, one or more processors (e.g., CPUs) 205, an I/O device interface 210, I/O devices 212, and a network interface 215.

Each CPU 205 retrieves and executes programming instructions stored in the memory 225 or storage 230. In some embodiments, each CPU 205 can execute methods as shown and described in FIG. 3-5 (described hereinafter). The interconnect 220 is used to move data, such as programming instructions, between the CPU 205, I/O device interface 210, storage 230, network interface 215, and memory 225. The interconnect 220 can be implemented using one or more busses. The CPUs 205 can be a single CPU, multiple CPUs, or a single CPU having multiple processing cores in various embodiments. In some embodiments, a processor 205 can be a digital signal processor (DSP). Memory 225 is generally included to be representative of a random access memory (e.g., static random access memory (SRAM), dynamic random access memory (DRAM), or Flash). The storage 230 is generally included to be representative of a non-volatile memory, such as a hard disk drive, solid state device (SSD), removable memory cards, optical storage, or flash memory devices. In an alternative embodiment, the storage 230 can be replaced by storage area-network (SAN) devices, the cloud, or other devices connected to the symmetry management node 150 via the I/O device interface 210 or a communication network 250 via the network interface 215. In some embodiments, the memory 225, the storage 230, both memory 225 and storage 230, or portions thereof can comprise cache memory. Cache memory can be associated with individual processors 205 and/or shared amongst a plurality of processors 205 in various embodiments.

The network 250 can be implemented by any number of any suitable communications media (e.g., wide area network (WAN), local area network (LAN), Internet, Intranet, etc.). In certain embodiments, the network 250 can be implemented within a cloud computing environment or using one or more cloud computing services. In some embodiments, the network interface 215 communicates with both physical and virtual networks. For example, the inter-nodal connections 106 of FIG. 1 can be physical while the intra-nodal connections 108 of FIG. 1 can be virtual in some embodiments. Similarly, in various embodiments, the symmetry management node 150 can communicate with a symmetric multiprocessor architecture 100 of FIG. 1 via a virtual network while the symmetric multiprocessor architecture 100 communicates with itself via a physical network of inter-nodal connections 106 and intra-nodal connections 108.

The symmetry management node 150 and the I/O Devices 212 can be local to each other, and communicate via any appropriate local communication medium (e.g., local area network (LAN), hardwire, wireless link, Intranet, etc.) or they can be physically separated and communicate over a virtual network. In some embodiments, the I/O devices 212 can include a display unit capable of presenting information to a user and receiving one or more inputs from a user.

In some embodiments, the memory 225 stores architecture management instructions 228 and the storage 230 stores node data 234. However, in various embodiments, the architecture management instructions 228 and the node data 234 are stored partially in memory 225 and partially in storage 230, or they are stored entirely in memory 225 or entirely in storage 230, or they are accessed over a network 250 via the network interface 215.

The architecture management instructions 228 (also referred to herein as instructions 228) can store processor executable instructions for various methods such as the methods shown and described with respect to FIG. 3-5 (described hereinafter). In some embodiments, the storage 230 can contain node data 234. Node data 234 can include, but is not limited to, information regarding the location of each respective node in a multiprocessor architecture. In some embodiments, the node data 234 can further include information regarding the resources which are associated with each respective node of the multiprocessor architecture.

Figure 3:
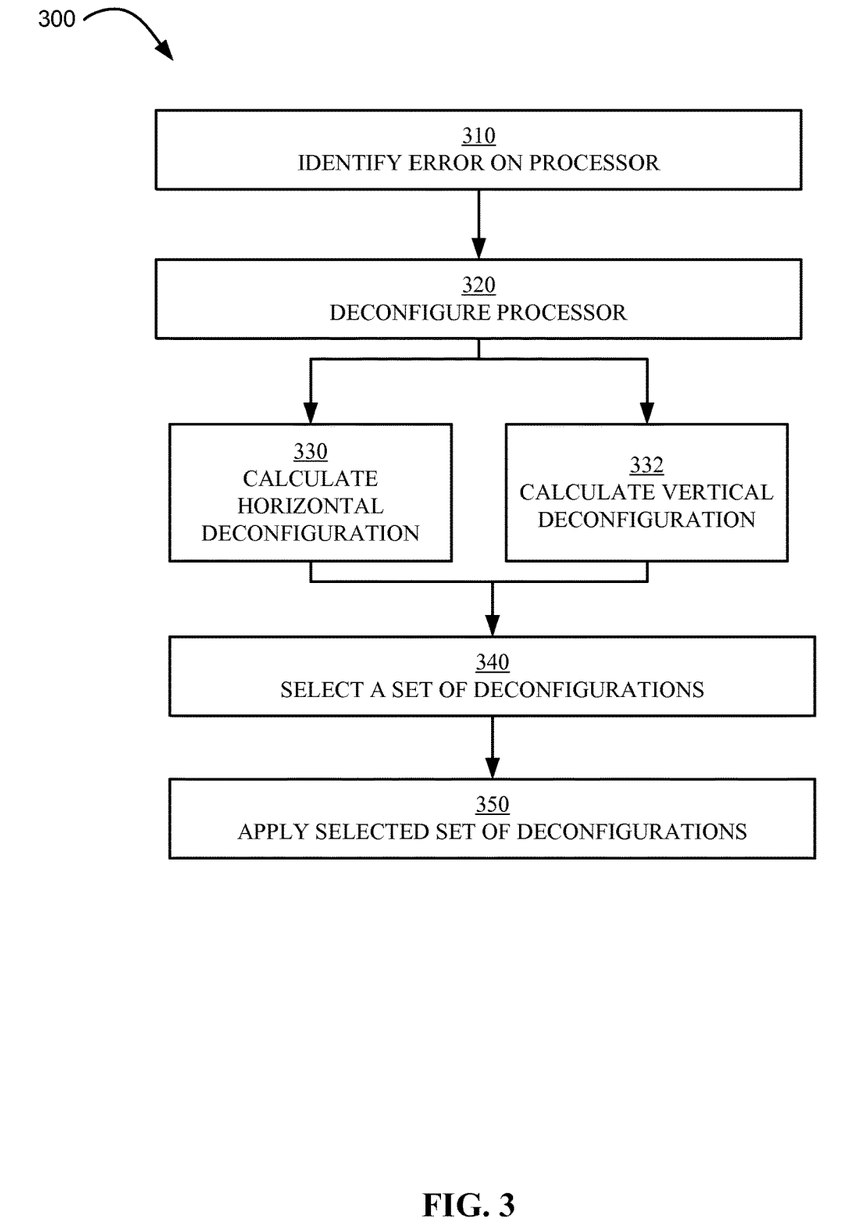
FIG. 3 illustrates a flowchart of a method to deconfigure a symmetric multiprocessor architecture following a first error on a first processor according to some embodiments of the present disclosure.

Referring now to FIG. 3, illustrated is a flowchart of a method to deconfigure a symmetric multiprocessor architecture following a first error on a first processor. In various embodiments, the method 300 can be executed by one or more CPUs (e.g., CPUs 205 of FIG. 2) executing a set of instructions (e.g., instructions 228 of FIG. 2). Although the method 300 can be implemented on any symmetric multiprocessor architecture, the method 300 will be described below with reference to a NUMA architecture in accordance with some embodiments of the present disclosure.

The method 300 can start with operation 310 in which an error is identified on a first processor of a NUMA architecture (e.g., system 100 of FIG. 1). In some embodiments, the error is an unrecoverable error and the failed processor can be isolated. In operation 320, the failed processor is deconfigured from the NUMA architecture. The deconfiguring of the failed processor from the architecture places the architecture in an asymmetric state. To retain symmetry within the NUMA architecture, either the processors which are horizontally associated with the failed processor or the processors which are vertically associated with the failed processor can be deconfigured. As an example, consider processor 112 of FIG. 1. If processor 112 fails and is deconfigured, then either the horizontally associated processors (i.e., 114 and 118 of FIG. 1) or the vertically associated processors (i.e., 122 and 132 of FIG. 1) must be deconfigured to return the NUMA architecture to a symmetric state.

In operation 330, the change in resources associated with deconfiguring the horizontally associated processors can be calculated. In operation 332, the change in resources associated with deconfiguring the vertically associated processors can be calculated. As shown, operations 330 and 332 can occur in parallel. In some embodiments, operations 330 and 332 can also occur sequentially. The change in resources can be a function of, but is not limited to, changes in memory, changes in expansion cards, incompatibilities resulting from the deconfiguration(s), and memory affinity issues which could result from the deconfiguration(s). The calculations of operations 330 and 332 are described in further detail hereinafter with respect to FIG. 5.

In operation 340, a set of deconfigurations is selected based on operations 330 and 332. The selected set of deconfigurations may reduce (relative to alternative sets of deconfigurations) lost resources and/or incompatibilities while returning the NUMA architecture to a symmetric state. In various embodiments, operation 340 can compare a single score generated by each of operations 330 and 332. In alternative embodiments, operation 340 can compare a plurality of scores generated by each of operations 330 and 332 (e.g., a score regarding memory lost, a score regarding incompatibilities, a score regarding memory affinity issues, etc.). Thus, in embodiments where a plurality of scores are compared, the various scores can be given weights based on relative importance as determined by the user. In some embodiments, the scores can comprise lexical outputs in addition to, or in lieu of, numerical outputs. Lexical outputs can comprise outputs such as, but not limited to "incompatible," "no compatibility issues," and so on. In various embodiments, the output of each of operations 330 and 332 can be collectively referred to as a cost or a set of costs.

In some embodiments, the determination occurring in operation 340 can be automatically made, without user input, based on pre-existing instructions (e.g., instructions 228 of FIG. 2) while in alternative embodiments, the determination in operation 340 is based on user input. For example, in embodiments when operation 340 is based on user input, a plurality of deconfiguration options can be output to an interface and the determination at operation 340 is based on user input selecting one of the deconfiguration options received via the interface. The interface can be the same or substantially the same as the I/O devices 212 of FIG. 2.

In operation 350, the selected deconfiguration is applied to the NUMA architecture. Operation 350 comprises, in various embodiments, a manual or automatic change made to the NUMA architecture to return the NUMA architecture to a symmetric state. The change can be automatically executed without user input by one or more processors (e.g., processors 205 of FIG. 2) or it can be executed in response to user input received, for example, via a user interface (e.g., I/O device 212 of FIG. 2).

Thus, as shown and described with respect to FIG. 3, various aspects of the present disclosure provide a set of deconfigurations to return a NUMA architecture to a state of symmetry. The set of deconfigurations can decrease resource losses and/or compatibility issues compared to alternative sets of deconfigurations in various embodiments.

Figure 4:
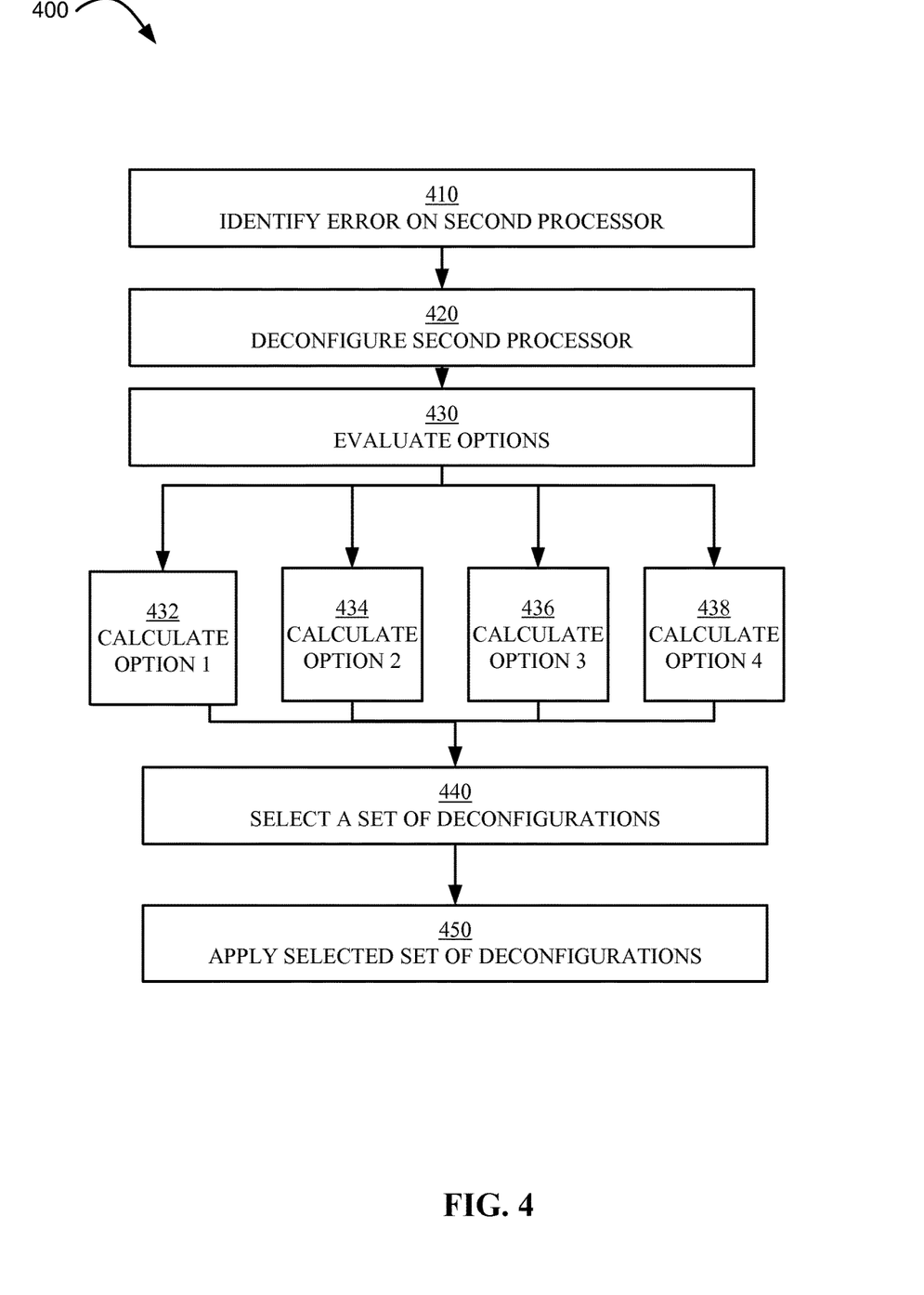
FIG. 4 illustrates a flowchart for a method to deconfigure a symmetric multiprocessor architecture following a second error on a second processor according to some embodiments of the present disclosure.

Referring now to FIG. 4, illustrated is a flowchart for a method to deconfigure a symmetric multiprocessor architecture following a second processor failure. Aspects of the method 400 can be implemented by a processor (e.g., CPUs 205 of FIG. 2) executing a set of instructions (e.g., architecture management instructions 228 of FIG. 2). Although the method 400 is applicable to any symmetric multiprocessor architecture, the method 400 will be described with reference to a NUMA architecture in accordance with some embodiments of the present disclosure.

The method 400 can occur following a first unrecoverable error in a first processor (e.g., following the method 300 shown and described in FIG. 3). The method 400 can begin with operation 410 in which a second unrecoverable error causes a second processor failure. In operation 420, the second failed processor can be deconfigured from the NUMA architecture.

In operation 430 a set of deconfiguration options which will return the NUMA architecture to a symmetric state can be defined. Specifically, in the example shown in FIG. 4, options 1-4 are defined in operations 432, 434, 436, and 438, respectively. The options defined in operations 432-438 comprise possible pairs of vertical and horizontal deconfigurations of the first and second failed processors which can return the NUMA architecture to a symmetric state. Referring to the first and second failed processors, the combinations of horizontal and vertical deconfigurations can be: horizontal-horizontal, horizontal-vertical, vertical-horizontal, and vertical-vertical. As an example, consider processors 112 and 114 of FIG. 1. If 112 is the first failed processor and 114 is the second failed processor, then the deconfigured processors associated with the previously cited options would be: 112-118 (horizontal-horizontal); 112-118, 124, and 134 (horizontal-vertical); 112-118, 122, and 132 (vertical-horizontal); and 112-114, 122-124, and 132-134 (vertical-vertical). Thus, it can be seen that the first option (horizontal-horizontal) deconfigures four processors while the second, third, and fourth options each deconfigure six processors. As a result, the horizontal-horizontal deconfiguration may be the selected set of deconfigurations. However, it should be noted that the various processors can be associated with unique sets of resources. Thus, the selected set of deconfigurations is not necessarily the set of deconfigurations resulting in the fewest deconfigured processors.

For each set of deconfigurations 432-438, the loss in resources is calculated (e.g., a similar operation to operation 330 and 332 of FIG. 3). The loss in resources can include, but is not limited to memory, expansion cards, compatibility issues, and memory affinity issues. The calculations 432-438 are shown and described in greater detail hereinafter with respect to FIG. 5.

In operation 440, the selected deconfiguration is determined according to the results of operations 432-438. The selected deconfiguration can be based on a single score or on a plurality of weighted scores. The selected deconfiguration can be automatically determined without user input or it can be determined based on user input received via an interface. In operation 450, the selected deconfiguration determined in operation 440 is applied to the NUMA architecture. The operation 450 can comprise changes implemented with or without user input which are physical, virtual, or both physical and virtual in nature to the architecture of the NUMA system.

Figure 5:
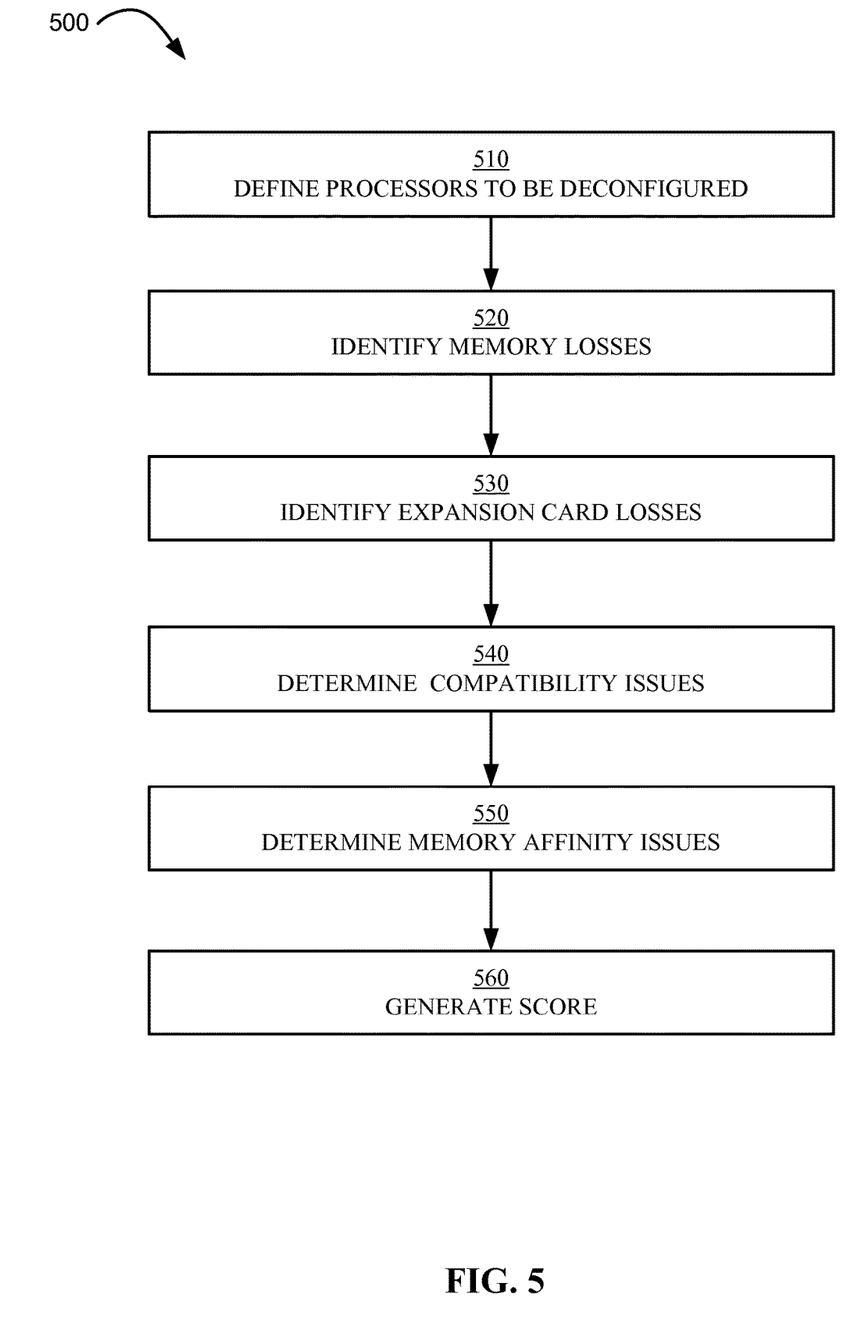
FIG. 5 illustrates a flowchart for a method to calculate the lost resources associated with a given set of deconfigurations according to some embodiments of the present disclosure.

Referring now to FIG. 5, illustrated is a flowchart of a method to calculate the lost resources associated with a given set of deconfigurations to return a symmetric multiprocessor architecture to a symmetric state. In some embodiments, the method 500 can be implemented by one or more processors (e.g., CPUs 205 of FIG. 2) executing a set of instructions (e.g., architecture management instructions 228 of FIG. 2). The method 500 can be, but is not limited to being, a subroutine of operations 330 and 332 of FIG. 3 and/or 432, 434, 436, and 438 of FIG. 4. Although the method 500 is applicable to any symmetric multiprocessor architecture, the method 500 will be described with reference to a NUMA architecture in accordance with some embodiments of the present disclosure.

The method 500 can begin by identifying a set of deconfigurations which would result in a NUMA architecture being returned to a state of symmetry in operation 510. The set of deconfigurations identified in operation 510 can comprise a set of nodes which can be vertically or horizontally associated with each failed processor of the one or more failed processors.

In operation 520 the memory loss associated with the deconfigured processors and/or processor cores can be calculated. The memory loss can be associated with main memory or cache memory (e.g., temporary memory specific to a processor, a processor core, or shared amongst a plurality processors or processor cores). The memory loss can be calculated by a summation of the associated memories, or it can comprise a weighted summation of the associated memories. In some embodiments, the weighting is based on attributes associated with the memory such as, but not limited to, whether the memory is volatile or non-volatile memory. In various embodiments, the weighting can be based on partitions associated with the memory or portions thereof.

In operation 530 the expansion card losses associated with the deconfigured processors and/or processor cores can be calculated. Expansion card losses can include one or more external devices coupled to an element (e.g., a processor core, a processor, or a node) which provides additional capability to the element. Expansion cards can be associated with memory, processing power, or other resources. In various embodiments, expansion card losses can account for the number of partitions using the expansion card resources. In some embodiments, expansion cards can refer to, but are not limited to, infiniband, ethernet, fibre channel, accelerators (e.g., coherent accelerator processor interface (CAPI)), and others.

In operation 540, incompatibility issues which may result from the set of deconfigured processors can be determined. Compatibilities, or lack thereof, can include communication issues such as impractically extensive or non-existent communication paths or incompatible communication protocols or instruction sets. The communicative incompatibilities can effect performance of, for example, inter-nodal connections 106, or intra-nodal connections 108 of FIG. 1, or network interface 215, I/O interface 210, instructions 228, node data 234, and/or CPUs 205 of FIG. 2. Operation 540 can also identify chipset incompatibilities or I/O device configuration compatibility issues resulting from the proposed set of deconfigurations. In some embodiments, the incompatibilities are determined by generating a hypothetical symmetric multiprocessor system absent the processors associated with the proposed deconfiguration.

In operation 550 memory affinity issues can be determined. In some embodiments, memory affinity can refer to static or dynamic affiliations between processes and processors, cores, or elements of a NUMA architecture. Specifically, memory affinity can refer to coupling processes to specific processors having relevant data stored therewith to increase process speed. Thus, operation 550 can, in some embodiments, indicate which processes and associated data will be lost or must be moved as a result of the proposed set of deconfigurations.

In operation 560, a score can be generated based on the results of operations 520-550. The score can comprise a single score accounting for all the information from the operations 520-550. In alternative embodiments, the score can comprise a set of individual scores accounting for each of the operations 520-550. It is to be understood that the scores generated can be, but are not limited to, numeric scores. In some embodiments, the output generated by the method 500 can be, for example, in the form of a description or a set of descriptions. Operation 560 can include, in some embodiments, outputting the score to an interface where it can be read and manipulated by a user.

Thus, the method 500 demonstrates various example resources which are accounted for when deconfiguring a set of processors to return a NUMA architecture (or any SMP system) to a symmetric state in accordance with some embodiments of the present disclosure. These various resources can be used, individually or in combination, to select a set of deconfigurations based on the functionality required by the NUMA system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   identifying a first failed processor, wherein the first failed processor is a component of a symmetric multiprocessor system, wherein the first failed processor is associated with a set of horizontally corresponding processors and a set of vertically corresponding processors in the symmetric multiprocessor system;
   calculating a horizontal cost of deconfiguring the first failed processor and the set of horizontally corresponding processors;
   calculating a vertical cost of deconfiguring the first failed processor and the set of vertically corresponding processors;
   wherein calculating a respective cost selected from the group consisting of: the horizontal cost and the vertical cost comprises:
     identifying the first failed processor and a set of corresponding processors to be deconfigured;
     identifying a respective memory associated with each processor of the set of corresponding processors; and
     generating the respective cost based on each respective memory associated with each processor of the set of corresponding processors, wherein the respective cost is selected from the group consisting of:
   numerical outputs, lexical outputs, and a combination of numerical and lexical outputs;
   determining a first deconfiguration based on the horizontal cost and the vertical cost; and
   deconfiguring a set of processors associated with the first deconfiguration by removing functionality of the set of processors associated with the first deconfiguration from the symmetric multiprocessor system.

2. The method of claim 1, wherein horizontally corresponding processors exist on a same node and wherein vertically corresponding processors exist in a same location in each node of the symmetric multiprocessor system.

3. The method of claim 1, wherein the symmetric multiprocessor system comprises a non-uniform memory access (NUMA) system.

4. The method of claim 1, further comprising:
identifying a second failed processor;
calculating a first cost of deconfiguring the first failed processor and the set of horizontally corresponding processors associated with the first failed processor and deconfiguring the second failed processor and a set of horizontally corresponding processors associated with the second failed processor;
calculating a second cost of deconfiguring the first failed processor and the set of horizontally corresponding processors associated with the first failed processor and deconfiguring the second failed processor and a set of vertically corresponding processors associated with the second failed processor;
calculating a third cost of deconfiguring the first failed processor and the set of vertically corresponding processors associated with the first failed processor and deconfiguring the second failed processor and the set of horizontally corresponding processors associated with the second failed processor;
calculating a fourth cost of deconfiguring the first failed processor and the set of vertically corresponding processors associated with the first failed processor and deconfiguring the second failed processor and the set of vertically corresponding processors associated with the second failed processor;
determining a second deconfiguration based on the first cost, the second cost, the third cost, and the fourth cost; and
applying the second deconfiguration to the symmetric multiprocessor system.

5. The method of claim 4, wherein applying the second deconfiguration further comprises:
reconfiguring the set of processors associated with the first deconfiguration; and
deconfiguring a set of processors associated with the second deconfiguration.

6. The method of claim 1, further comprising:
determining a respective set of expansion cards which are associated with each processor of the set of corresponding processors, wherein each respective set of expansion cards can comprise one or more resources selected from the group consisting of: memory resources, processing resources, and communication resources.

7. The method of claim 1, calculating a respective cost further comprising:
determining a set of incompatibilities associated with the symmetric multiprocessor system absent the first failed processor and the set of corresponding processors, wherein the set of incompatibilities comprises functional incompatibilities between components selected from the group consisting of: processors, nodes, expansion cards, data, and instructions, wherein the respective cost is further based on the set of incompatibilities.

8. The method of claim 1, calculating a respective cost further comprising:
determining a set of memory affinity issues, wherein the set of memory affinity issues comprises associations between processes and the set of corresponding processors wherein the respective cost is further based on the set of memory affinity issues.

9. A system comprising:
a symmetric multiprocessor architecture comprising a plurality of nodes, each node comprising a plurality of processors, wherein each processor is associated with one or more types of memory;
an interface configured to present a user with information and receive user inputs;
a control unit operably coupled to the symmetric multiprocessor architecture and the interface, the control unit capable of manipulating the symmetric multiprocessor architecture, wherein the control unit comprises a memory and a processor configured to:
identify a first failed processor, wherein the first failed processor is a component of the symmetric multiprocessor architecture;
identify one or more sets of deconfigurations which return the symmetric multiprocessor architecture to a symmetric state;
calculate a first set of respective costs for each respective set of deconfigurations;
output to the interface one or more outputs selected from the group consisting of: an error indicating the first failed processor, the first set of costs, and the one or more sets of deconfigurations;
select one of the one or more sets of deconfigurations based on the respective costs for each set of deconfigurations; and
deconfigure a set of processors associated with the selected deconfiguration by removing functionality of the set of processors associated with the selected deconfiguration from the symmetric multiprocessor architecture.

10. The system of claim 9, wherein the processor in the control unit is configured to select one of the one or more sets of deconfigurations based on user input received via the interface.

11. The system of claim 9, wherein the processor in the control unit is configured to calculate the first set of respective costs by:
identifying the first failed processor and a set of corresponding processors to be deconfigured;
identifying a respective memory associated with each processor of the set of corresponding processors;
determining a respective set of expansion cards which are associated with each processor of the set of corresponding processors, wherein each respective set of expansion cards can comprise one or more resources selected from the group consisting of: memory resources, processing resources, and communication resources;
determining a set of incompatibilities associated with the symmetric multiprocessor architecture absent the first failed processor and the set of corresponding processors, wherein the set of incompatibilities comprises functional incompatibilities between components selected from the group consisting of: processors, nodes, expansion cards, data, and instructions;
determining a set of memory affinity issues, wherein the set of memory affinity issues comprises associations between processes and the set of corresponding processors; and
generating the first set of respective costs based on the respective memories, the respective set of expansion cards, the set of incompatibilities, and the set of memory affinity issues, wherein the first set of respective costs is selected from the group consisting of: numerical outputs, lexical outputs, and a combination of numerical and lexical outputs.

12. The system of claim 9, wherein the processor in the control unit is further configured to:

identify a second failed processor in the symmetric multiprocessor architecture;
identify a second set of deconfigurations which return the symmetric multiprocessor architecture to a symmetric state;
calculate a second set of respective costs for each respective deconfiguration of the second set of deconfigurations;
select a second deconfiguration from the second set of deconfigurations based on the second set of costs;
apply the selected second deconfiguration,
wherein to apply the selected second deconfiguration, the processor is further configured to:
reconfigure the set of processors associated with the selected deconfiguration; and
deconfigure a set of processors associated with the second deconfiguration.

13. The system of claim 9, wherein the symmetric multiprocessor architecture comprises a non-uniform memory access (NUMA) system.

14. A computer program product for managing symmetry in a symmetric multiprocessor system, the computer program product comprising a computer readable storage medium having program instructions embodied therewith, the program instructions executable by a processor to cause the processor to:
determine, based on a first failed processor, a plurality of deconfiguration options which cause the symmetric multiprocessor system to return to a symmetric state;
determine a respective cost for each respective deconfiguration option;
wherein determining a respective cost comprises:
identifying the first failed processor and a set of corresponding processors to be deconfigured;
identifying a respective memory associated with each processor of the set of corresponding processors; and
generating the respective cost based on each respective memory associated with each processor of the set of corresponding processors, wherein the respective cost is selected from the group consisting of: numerical outputs, lexical outputs, and a combination of numerical and lexical outputs;
output a respective set of costs associated with the plurality of deconfiguration options;
select, based on the respective set of costs associated with the plurality of deconfiguration options, a first deconfiguration option; and
apply the first deconfiguration option to the symmetric multiprocessor system by removing functionality associated with processors associated with the first deconfiguration option from the symmetric multiprocessor system.

15. The computer program product of claim 14, wherein the symmetric multiprocessor system comprises a non-uniform memory access (NUMA) system.

16. The computer program product of claim 14, wherein the program instructions further cause the processor to determine a respective cost by causing the processor to:
determine a respective set of expansion cards which are associated with each processor of the set of corresponding processors, wherein each respective set of expansion cards can comprise one or more resources selected from the group consisting of: memory resources, processing resources, and communication resources;
determine a set of incompatibilities associated with the symmetric multiprocessor system absent the first failed processor and the set of corresponding processors, wherein the set of incompatibilities comprises functional incompatibilities between components selected from the group consisting of: processors, nodes, expansion cards, data, and instructions;
determine a set of memory affinity issues, wherein the set of memory affinity issues comprises associations between processes and the set of corresponding processors; and
wherein the respective cost is further based on the respective set of expansion cards, the set of incompatibilities, and the set of memory affinity issues.

17. The computer program product of claim 14, wherein the program instructions further cause the processor to:
determine, based on a second failed processor, a second set of deconfiguration options which can cause the symmetric multiprocessor system to return to a symmetric state;
determine a respective second cost for each respective second deconfiguration option;
output a second set of costs associated with the second set of deconfiguration options;
select, based on the second set of costs associated with the second set of deconfiguration options, a second deconfiguration option; and
apply the second deconfiguration option to the symmetric multiprocessor system.

18. The computer program product of claim 17, wherein the program instructions further cause the processor to apply the second deconfiguration option by causing the processor to:
reconfigure a set of processors associated with the first deconfiguration option; and
deconfigure a set of processors associated with the second deconfiguration option.

19. The system of claim 9, wherein the one or more sets of deconfigurations which return the symmetric multiprocessor architecture to a symmetric state comprise at least one horizontal deconfiguration of the first failed processor and a set of horizontally corresponding processors, and at least one vertical deconfiguration of the first failed processor and a set of vertically corresponding processors; and
wherein horizontally corresponding processors exist on a same node, and wherein vertically corresponding processors exist in a same location in each node of the symmetric multiprocessor architecture.

20. The computer program product of claim 14, wherein the plurality of deconfiguration options comprises at least one horizontal deconfiguration option comprising processors horizontally corresponding to the first failed processor, and at least one vertical deconfiguration option comprising processors vertically corresponding to the first failed processor; and
wherein horizontally corresponding processors exist on a same node, and wherein vertically corresponding processors exist in a same location in each node of the symmetric multiprocessor system.

* * * * *